(12) United States Patent
Derscheid et al.

(10) Patent No.: US 10,687,472 B2
(45) Date of Patent: Jun. 23, 2020

(54) BALE WEIGHT MEASUREMENT DEVICE (71) Applicant: Deere & Company, Moline, IL (US)

(72) Inventors: Daniel E. Derscheid, Hedrick, IA (US); Benjamin D. Koch, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 208 days.

(21) Appl. No.: 15/975,171

(22) Filed: May 9, 2018

(65) Prior Publication Data
US 2019/0343052 A1 Nov. 14, 2019

(51) Int. Cl.
A01F 15/08 (2006.01)

(52) U.S. Cl.
CPC ...... *A01F 15/0833* (2013.01); *A01F 15/0883* (2013.01); *A01F 2015/0891* (2013.01)

(58) Field of Classification Search
CPC ............ A01F 15/833; A01F 15/0883; A01F 2015/0891; G01G 19/08; G01G 19/12
See application file for complete search history.

(56) References Cited

U.S. PATENT DOCUMENTS

| 4,258,540 A | 3/1981 | Munro | |
|---|---|---|---|
| 4,362,097 A | 12/1982 | Rogers | |
| 5,892,181 A * | 4/1999 | Takahashi | G01G 19/08 177/136 |
| 5,913,801 A * | 6/1999 | Bottinger | A01B 79/005 56/10.2 R |
| 6,037,550 A * | 3/2000 | Bradley | G01G 19/12 177/136 |
| 6,248,963 B1 | 6/2001 | Gottlober | |
| 6,378,276 B1 * | 4/2002 | Dorge | A01F 15/0833 177/136 |
| 7,064,282 B2 | 6/2006 | Viaud et al. | |
| 2002/0059835 A1 * | 5/2002 | Miyazaki | G01G 19/12 73/856 |
| 2004/0020065 A1 * | 2/2004 | Carr | B61K 9/08 33/338 |
| 2009/0048790 A1 * | 2/2009 | Geraghty | G01G 19/12 702/42 |
| 2009/0217827 A1 | 9/2009 | Duenwald et al. | |
| 2012/0109564 A1 | 5/2012 | Kraus | |
| 2014/0090903 A1 | 4/2014 | Kraus | |

(Continued)

FOREIGN PATENT DOCUMENTS

| EP | 2745675 A1 | 6/2014 | |
|---|---|---|---|
| EP | 3 440 925 A1 * | 2/2019 | G01G 19/12 |

OTHER PUBLICATIONS

European Search Report issued in counterpart application No. 19173357.5 dated Sep. 12, 2019. (15 pages).

(Continued)

*Primary Examiner* — Natalie Huls (57) ABSTRACT

A baler for forming a bale includes a frame, an axle, a sensor, and at least one overload stop. The frame supports a bale chamber. The axle is connected to the frame at a first location and spaced apart from the frame at a second location. The sensor is positioned to measure the deflection of the axle. The deflection of the axle changes based upon a weight of the bale. The at least one overload stop is positioned on one of the axle and the frame to limit the deflection of the axle relative to the frame.

14 Claims, 11 Drawing Sheets (56) References Cited

U.S. PATENT DOCUMENTS

| | | | |
|---|---|---|---|
| 2014/0090904 A1* | 4/2014 | Kraus | G01G 9/00 |
| | | | 177/1 |
| 2014/0174303 A1 | 6/2014 | Posselius et al. | |
| 2014/0298923 A1* | 10/2014 | Geldman | G01L 1/2287 |
| | | | 73/862.627 |
| 2016/0120129 A1 | 5/2016 | Verhaeghe et al. | |
| 2018/0121467 A1* | 5/2018 | Derscheid | A01F 15/07 |
| 2019/0069493 A1 | 3/2019 | Beaufort et al. | |

OTHER PUBLICATIONS

European Search Report issued in counterpart European Patent Application No. 19173357.5 dated Jan. 24, 2020 (14 pages).

* cited by examiner

FIG. 8

BALE WEIGHT MEASUREMENT DEVICE

RELATED APPLICATIONS

N/A

FIELD OF THE DISCLOSURE

The present disclosure relates to a system for determining the weight of a bale and protecting the parts of a baler utilized in bale weighing.

BACKGROUND OF THE DISCLOSURE

The weight of a bale is information desired by operators. The information can be used to evaluate the yield in a particular field. In addition, based on pre-stored data or operator experience, the information can indicate a moisture level of the harvested bale. In order to transport multiple bales, summing bales with various weights will help the user to plan loads for transportation within the acceptable maximum weight limits. There is a need for a more accurate bale weight apparatus and system, with the protection for parts of a baler utilized in bale weighing.

SUMMARY OF THE DISCLOSURE

This summary is provided to introduce a selection of concepts that are further described below in the detailed description and accompanying drawings. This summary is not intended to identify key or essential features of the appended claims, nor is it intended to be used as an aid in determining the scope of the appended claims.

According to an aspect of the present disclosure, a baler for forming a bale includes a frame, an axle, a sensor, and at least one overload stop. The frame supports a bale chamber. The axle is connected to the frame at a first location and spaced apart from the frame at a second location. The sensor is positioned to measure the deflection of the axle. The deflection of the axle changes based upon a weight of the bale. The at least one overload stop is positioned on one of the axle and the frame to limit the deflection of the axle relative to the frame.

According to an aspect of the present disclosure, a baler for forming a bale includes a frame, axle housing, first and second spindles, first, second, and third sensors, a linkage, and a processing unit. The frame supports a bale chamber. The first spindle is partially surrounded by the axle housing, and is spaced apart from the axle housing. The second spindle is partially surrounded by the axle housing, and is spaced apart from the axle housing. The first sensor is positioned at one of the axle housing and the first spindle, and is configured to detect a first deflection of the first spindle based upon a first distance between the first spindle and the axle housing. The second sensor is positioned at one of the axle housing and the second spindle, and is configured to detect a second deflection of the second spindle based upon a second distance between the second spindle and the axle housing. The linkage is coupled to a front portion of the frame, and is partially surrounded by a linkage housing. The linkage is spaced apart from the linkage housing. The third sensor is coupled to the linkage, and is configured to detect a third deflection of the linkage. The processing unit is connected to the first, second, and third sensors, and is configured to calculate a weight of the bale based upon the detected first, second, and third deflections.

A method of measuring a weight of a baler in a baler may include determining a first deflection of an axle via a sensor; forming a bale in the baler; detecting a second deflection of the axle via the sensor; comparing the first and second deflections of the axle to calculate the weight of the bale; and limiting the deflection of the axle within a pre-determined amount via an overload stop.

Other features and aspects will become apparent by consideration of the detailed description and accompanying drawings.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

DETAILED DESCRIPTION

Figure 1:
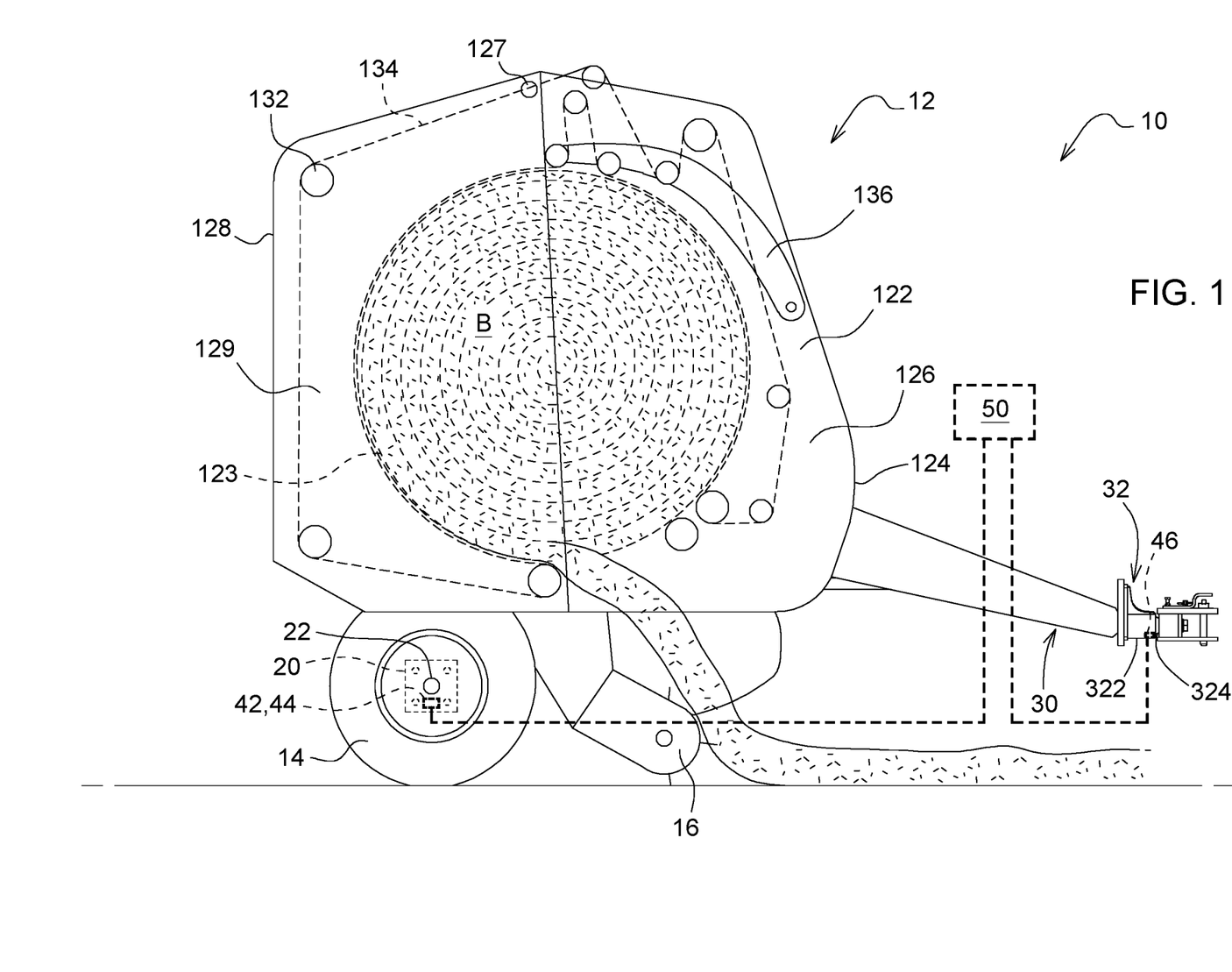
FIG. 1 is a side view of a baler.

Referring to FIG. 1, a round baler 10 includes a frame 12 and an axle housing 20 coupled to the frame 12. An axle 22 is coupled to the frame 12, axle housing 20, or both and is partially surrounded by the axle housing 20. The frame 12 is supported on a pair of ground engaging devices, such as wheels 14, coupled to the axle 22. A linkage or draft tongue 30 is coupled to the frame 12 (or front wall 124) and includes a clevis arrangement 32 adapted for being coupled to a towing vehicle (not shown).

The frame 12 includes an enclosure 122 formed at least in part by a front wall 124, two side walls 126, and a discharge gate 128, which pivots vertically about a horizontal pivot arrangement 127 located at an upper rear location of the side walls 126. A gate cylinder arrangement (not shown) is coupled between the frame 12 and side walls 129 of the discharge gate 128 and is selectively operable for moving the discharge gate 128 between a lowered baling position and an opened discharge position. The discharge gate 128 remains at the lowered baling position when a bale B is forming and then moves to the opened discharge position when the bale B completes its wrapping process and is at an appropriate place to release the bale B (not shown).

The baler 10 includes a bale forming chamber 123. The baler 10 may be a variable or fixed chamber baler. The baler 10 includes a plurality of longitudinally extending side-by-side belts 134 supported on a plurality of rollers 132 (only a few of which are shown). The variable or fixed bale forming chamber 123 is defined by the side walls 126, 129, the rollers 132 and the belts 134.

The baler 10 as illustrated is a variable chamber design, wherein crop is rolled up in a spiral fashion in a nip formed between oppositely moving adjacent loops of belts 134. When the baler 10 moves across the ground and a supplying device 16 of baler keeps conveying the crops from the ground, the space between adjacent loops of belts 134 grows as the forming bale B grows larger. Accordingly, a belt tensioning device 136 is provided to take up slack in the belts 134 as needed. Thus the position of the tensioning device 136, at any given time, is an indication of the size of the bale B at that time. A bale diameter sensor (not shown) in the form of a potentiometer is affixed to the pivot point of the tensioning device 136 and thus provides an electrical signal correlating with bale diameter to an processing unit or Electronic Control Unit (ECU) 50. The processing unit 50 is provided for electronically controlling and monitoring a number of functions of the baler 10. For example, the processing unit 50 in addition to monitoring bale size and other functions, can further be adapted for triggering a twine or wrapping cycle, opening the discharge gate, initiating bale discharge, controlling the application of preservative to the bate and for communicating crop moisture content and other information to the user. In addition, the processing unit 50 may be used for determining the weight of a bale as described in more detail below.

Figure 2:
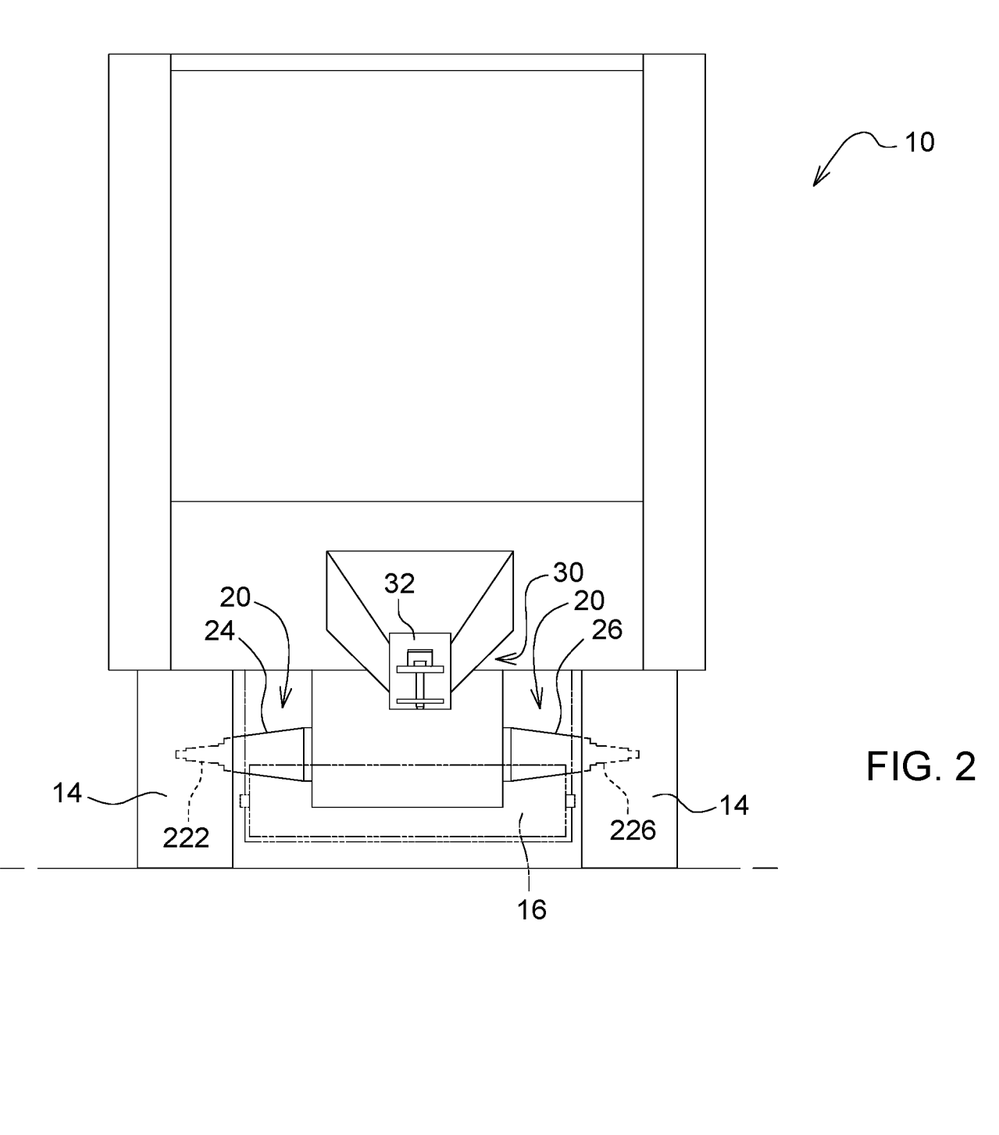
FIG. 2 is a front view of the baler.

Referring to FIGS. 1 and 2, the axle housing 20, in this embodiment, includes a first housing 24 and a second housing 26 positioned opposite to one another. The axle 22 includes a first spindle 222 and a second spindle 226. The first spindle 222 is partially surrounded by the first housing 24 and the second spindle 226 partially surrounded by the second housing 26. The clevis arrangement 32 includes a hitch housing 322 and a hitch rod 324 surrounded by the hitch housing 322. The baler 10 further includes multiple sensors 40 (will be shown in FIGS. 3A-7B), including a first sensor 42, a second sensor 44, and a third sensor 46. In this embodiment, the multiple sensors 40 detect or measure a space or gap between the first and second spindles 222, 226 and the first and second housings 24, 26 and between the hitch housing 322 and the hitch rod 324. The sensors 40 may be optical, inductive, hall effect, and/or other means of sensors. The sensors 40 may not only used for detecting distance that may reflect to deflections of spindles or hitch rod, but the sensors may be used for detecting the deflection indirectly, or directly, such as strain gages (load cells). Detail structures of axle housing, axle, and sensors will be delineated in later description. It is noted that the number and the location of the sensors are shown and described by way of illustration, the sensors may also be applied to just one of spindle housing/spindle, one spindle housing/spindle and one hitch housing/hitch rod, or any other configurations.

Figure 3A:
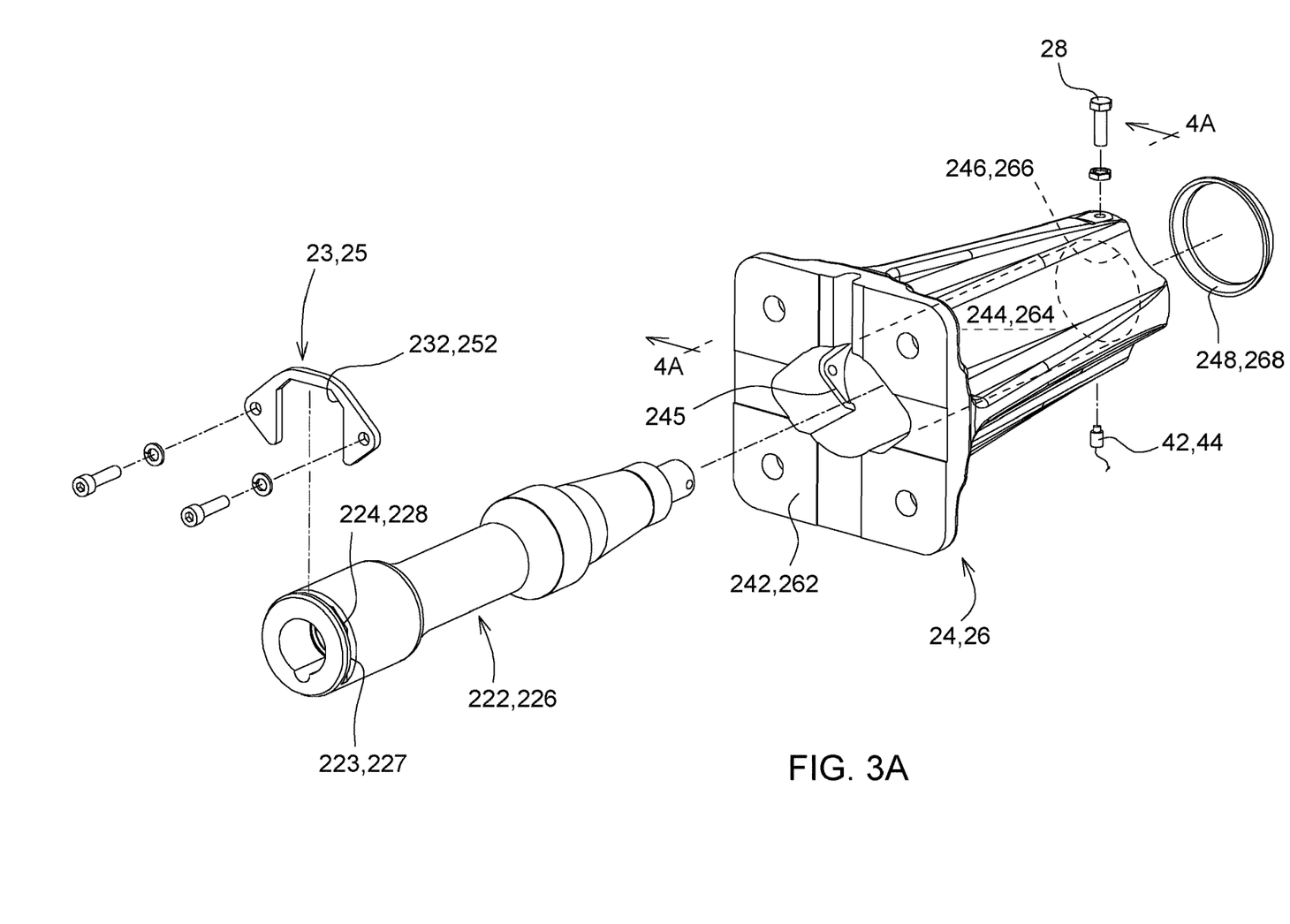
FIG. 3A is an exploded view of an axle housing, an axle, an overload stop, and other components.
Figure 4A:
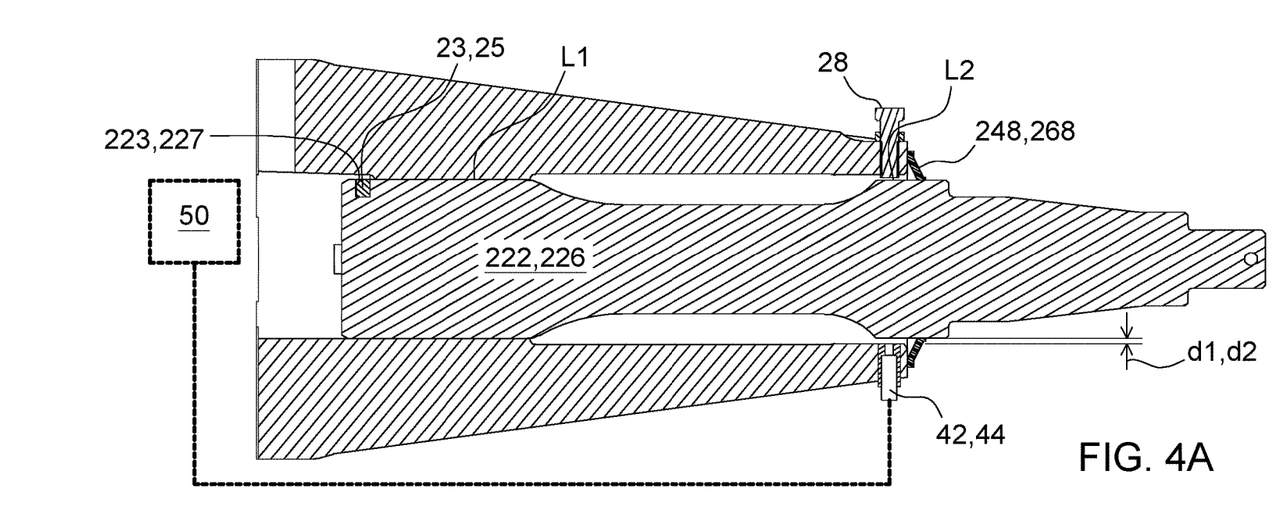
FIG. 4A is a cross-sectional view of FIG. 3A.
Figure 4B:
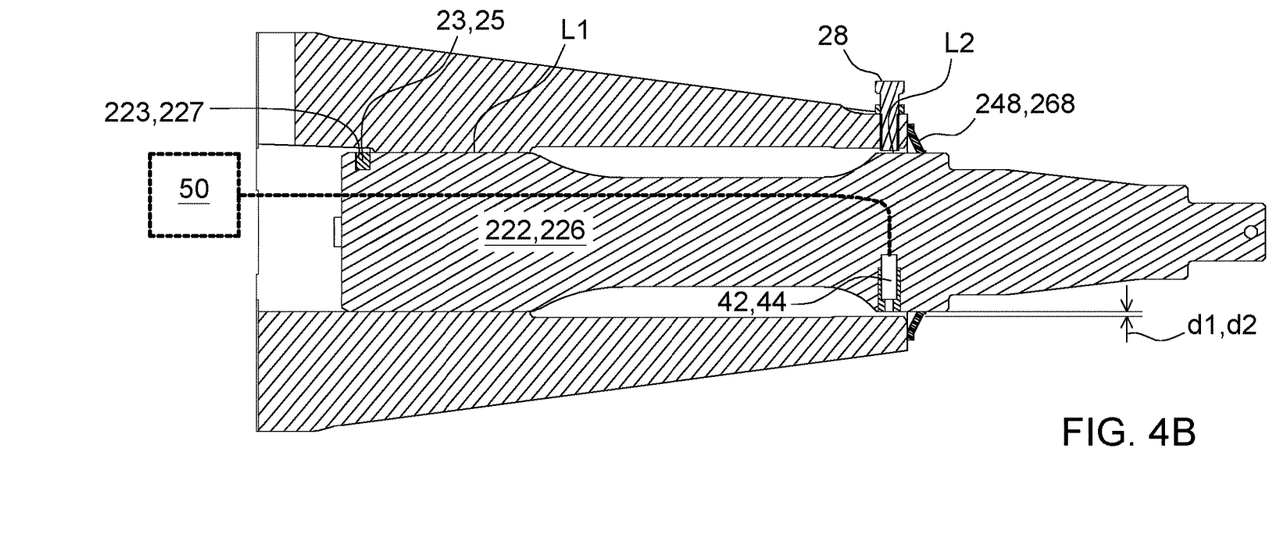
FIG. 4B is a cross-sectional view of another embodiment of axle housing, axle, and sensor.

FIGS. 4A and 4B demonstrate sensors that measure the distances changed between the spindles and housing to obtain the deflection of the spindles. Referring to FIGS. 3A and 4A, in this embodiment, the first spindle 222 and the second spindle 226 are symmetric to each other, and the first housing 24 and the second housing 26 are symmetric to each other, so these two sets are shown with reference numbers adjacent to each other.

The first housing 24 has a first connecting portion 242, a first inner surface 244, and a first opening 246. The first connecting portion 242 extends radially at one end (inner end) of the first housing 24 to form a substantially square shape with an opening at the center for the first spindle 222 to insert into the first housing 24. Adjacent to the four corners of the first connecting portion 242 are four apertures for fasteners or other means to fix the first housing 24 on the frame 12. The first spindle 222 is partially surrounded by the first inner surface 244. The first spindle 222 is connected to the first housing 24 at a first location L1 and spaced apart from the first housing 24 at a second location L2. At the second location L2, a portion of the first spindle 222 can extend radially outward more than adjacent portions of the spindle. The first and second spindles 222, 226 can include one or more different diameters along the axial length of the spindles. For example, the spindles 222, 226 can include a larger diameter portion at the first and second locations and smaller diameter portions between the first and second locations and axially outward of the second location. The first opening 246 is located at the other end (outer end) of the first housing 24. The first inner surface radially protrudes a pair of first mounting platforms 245 (only shown one of the first mounting platforms in FIG. 3A).

An outer portion of the first spindle 222 passes through the first opening 246 and is coupled to one of the ground engaging wheels 14. The first spindle 222 includes a first groove 223 adjacent to the inner end of the first spindle 222. The bottom of the first groove 223 may include multiple edges 224. The baler 10 further includes a first mounting plate 23 having multiple edges 232. A portion of the first mounting plate 23 is inserted into the first groove 223, with the corresponding edges 224, 232 contacting each other to limit the movement between the first mounting plate 23 and the first spindle 222. The first mounting plate 23 is coupled to the first mounting platforms via fasteners or other means.

A first distance or first radial deflection gap d1 is between the first spindle 222 and the first housing 24. Because of the weight of the baler 10, with or without the bale B, the first spindle 222 deflects in different degrees and therefore the first distance d1 is related to the weight of the baler 10 and bale B. In the embodiment shown in FIGS. 3A, 4A, the first sensor 42 is positioned in the first housing to detect the first distance d1. Alternatively, FIG. 4B demonstrates a cross-sectional view of another embodiment of the axle housing, axle, and sensor. In this embodiment, the first sensor 42 is positioned within the first spindle 222 to detect the first distance d1. Because FIGS. 4A, 4B demonstrate the first sensor 42 positioned at lower portion adjacent to the first opening 246 of first housing 24 or first spindle 222, if the load of the baler increases, the first distance d1 detected by the first sensor 42 will increase until the upper portions adjacent to the first opening 246 of the first housing 24 (or an overload stop 28 discussed later) and first spindle 222 contact. Alternatively, if the first sensor 42 is positioned at upper portion adjacent to the first opening 246 of the first housing 24 or first spindle 222 (not shown) and if the load of the baler increases, the first distance d1 detected by the first sensor 42 will decrease until the upper portions adjacent to the first opening 246 of the first housing 24 (or an overload stop 28 discussed in more detail below) and first spindle 222 contact. It is noted that this embodiment illustrates the distance between the first spindle 222 and the first housing 24 reflecting a deflection of the first spindle 222 is merely an example. The deflection may include any other kinds of formats.

The detected results will be transmitted to the processing unit 50 to calculate the weight of the bale B. The processing unit 50 may utilize the deflections of the first spindle 222 when the bale B is still in the baler 10, cross-referencing a pre-stored calibration data to determine the weight of the bale B. Or alternatively, when the bale B is still in the baler 10, the processing unit 50 may receive the deflection information of the first spindle 222 to determine the total weight of the baler 10 and the bale B. After the bale B is discharged from the baler 10, then the processing unit 50 may receive the deflection information of the spindle 222 to determine the weight of the baler 10. The weight of the bale B which had been just discharged will be calculated by comparing the weights of the baler 10 with and without the bale B. In regards to the information from other sensors such as the second sensor 44 and the third sensor 46, the processing unit 50 may utilize either approach to determine the weight of the bale B. The processing unit 50 may utilize the output or measurements of the one or more first, second, and third sensors 42, 44, 46 to determine the weight of the baler 10 and the bale B. In one embodiment, the processing unit 50 utilizes the measurements of all three sensors 42, 44, 46 to determine the weight of the baler 10 with the bale B and the weight of the empty baler 10 without the bale B.

Figure 4C:
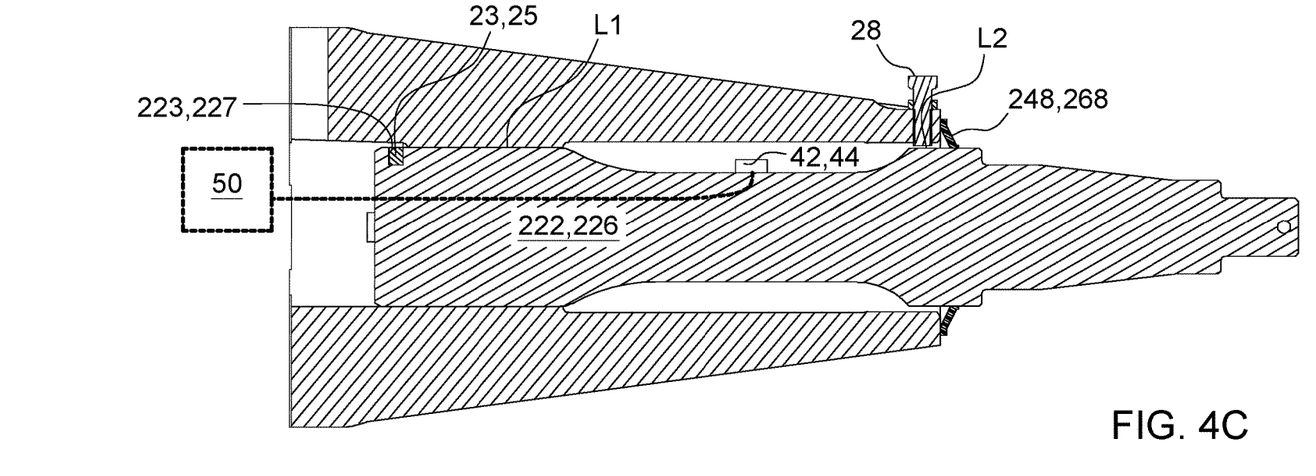
FIG. 4C is a cross-sectional view of another embodiment of a sensor detecting the deflection outside of the axle.
Figure 4D:
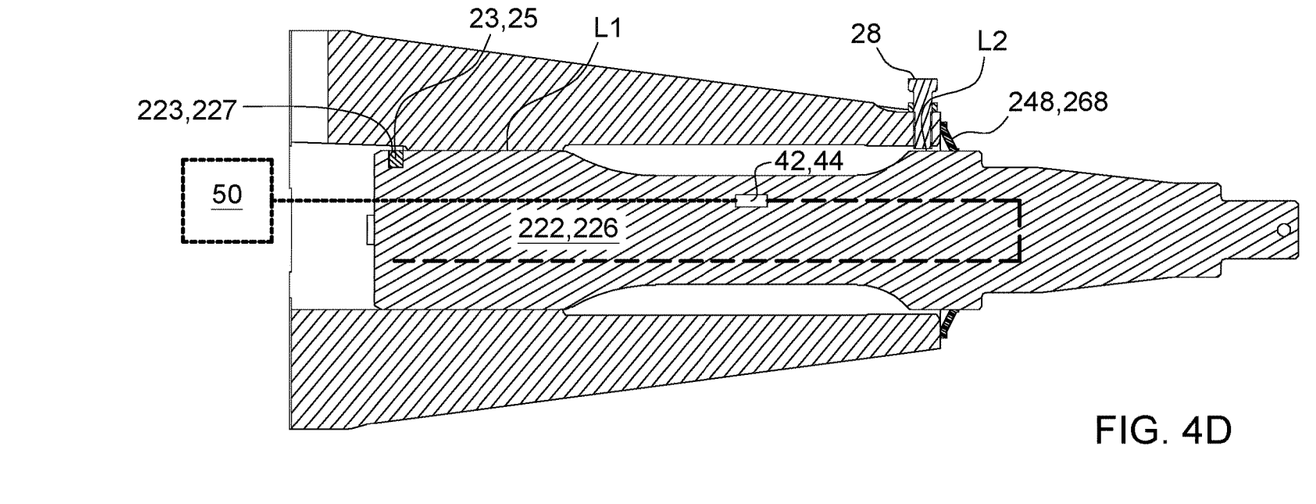
FIG. 4D is a cross-sectional view of another embodiment of sensor detecting the deflection within the axle.

FIGS. 4C and 4D illustrates sensors that measure the deflections of the spindles. Referring to 4C, the first sensor 42, for example, a load cell attaches to an external surface of the spindle 222. The first sensor 42 can be positioned between the first location L1 and the second location L2, including the second location L2.

Referring to 4D, in this embodiment, the first sensor 42 is an internal sensor positioned within the spindle 222. The first sensor 42 is configured to measure the deflection of the spindle 222 or indirectly measure an object (shown in dash line) which deflects together with the spindle 222.

Figure 3B:
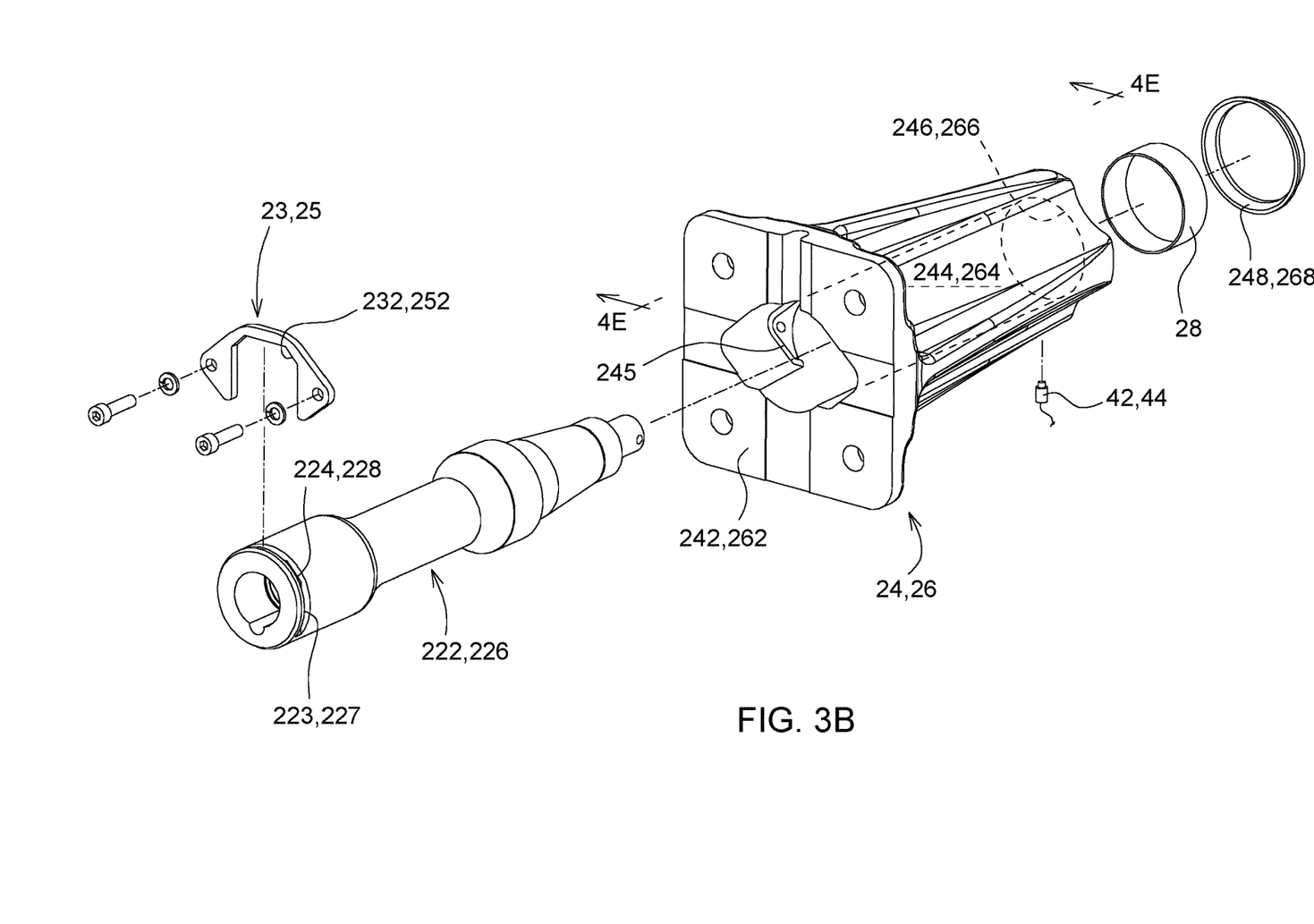
FIG. 3B is an exploded view of the axle housing, the axle, another embodiment of an overload stop, and other components.
Figure 4E:
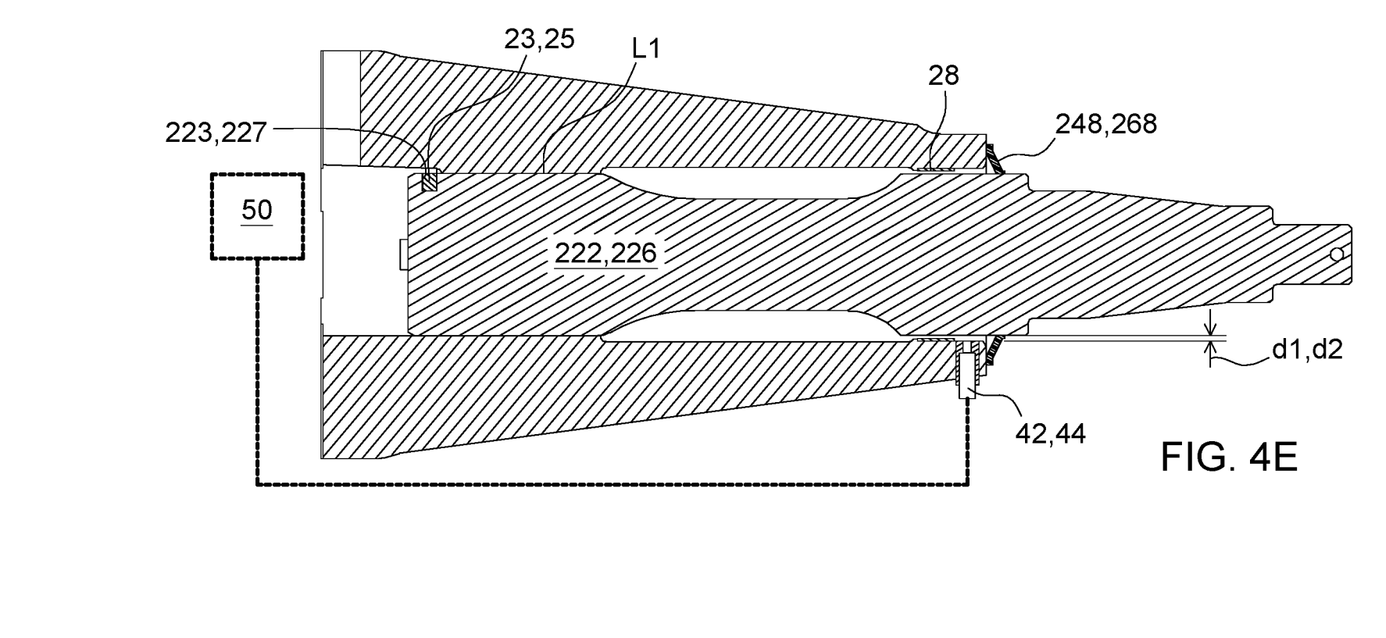
FIG. 4E is a cross-sectional view of another embodiment of an overload stop.

Optionally, at least an overload stop 28, such as a fastener in the embodiments shown in FIGS. 4A-4B, protrudes or extends from the first inner surface 244 toward the first spindle 222. Accordingly, a range of the first distance d1 detected by the first sensor 42 is reduced because the overload stop 28 limits the deflection of the first spindle 222 and prevents the first spindle 222 from contacting the upper portion adjacent to the first opening 246 of the first housing 24. There are many circumstances that the overload stop 28 is utilized to limit such deflection, including but not limited to (1) crops that have more density such that the first spindle 222 deflects to contact the first housing 24 even before the baling is completed; (2) crops that may have more moister such that the first spindle 222 deflects to contact the first housing 24 even before the baling is completed; (3) when the baler 10 is moving or traveling, a sudden acceleration or brake may cause the first spindle 222 and the first housing 24 quickly approaching to one another; and (4) when the baler 10 is moving or traveling, a bumping road condition that may cause the baler 10 move suddenly; and (5) when the baler 10 is moving or traveling on a ramp. The overload stop prevents the spindle of the axle from mechanical fatigue. It is noted that the limitation of the deflection of the first spindle 222 is adjustable via rotating the fastener, for example. In addition, the number of the overload stop 28 can vary. Multiple overload stops can protrude or extend from one of the first spindle 222 and first housing 24. The multiple overload stops may be positioned surround the spindle 222 to provide 360 degrees protection from mechanical fatigue. Alternatively, the overload stop 28 can be a ring shape as shown in FIGS. 3B and 4E. The overload stop 28 can be a ring shape element attaching either on the first housing 24 or first spindle 222, or it protrudes or extends from either the first housing 24 or the first spindle 222 and is spaced apart from the other to allow a limited deflection of the spindle.

Referring to FIGS. 4C-4D, the overload stop 28 and the variation thereof, may be similar to the overload stop(s) described above. The overload stop(s) may also protect the first sensor 42 such as load cells. The load cells in this embodiment are strain-gage load cells. With the development of strain-gage load cells, it is available to measure very small strain, expressed by the unit of microstrain ($\mu\varepsilon$). The strain-gage load cells with high sensitivity (high gage factor, GF) may be proned to be damaged when the spindles they attached deflect beyond a durable range. Therefore, the overload stop(s) 28 limiting the deflection of the first spindle 222 may also help prolong the life of the first sensor 42, in this embodiment.

Optionally, a first seal 248 is positioned at the outer end of the first housing 24 and the first spindle 222. The first seal 248 is coupled to the first opening 246 and the first spindle 222. The first seal 248 prevents dust or other objects from entering into the first opening 246. In this regard, dust or other objects will not influence the accuracy of the detection and the weight of the bale B can be calculated more accurately.

In this embodiment, because the first spindle 222 and the second spindle 226 are symmetric to each other, and the first housing 24 and the second housing 26 are symmetric to each other, reference numbers of second set, including the second spindle 226, second groove 227, edge 228, second mounting plate 25, edge 252, second housing 26, second connecting portion 262, second inner surface 264, second mounting platform 265, second opening 266, second seal 268, second distance or second radial deflection gap d2, second sensor 44, are illustrated in FIGS. 3A, 4A-4D and adjacent to the corresponding reference numbers of the first set. There is no description for the second set.

Figure 5:
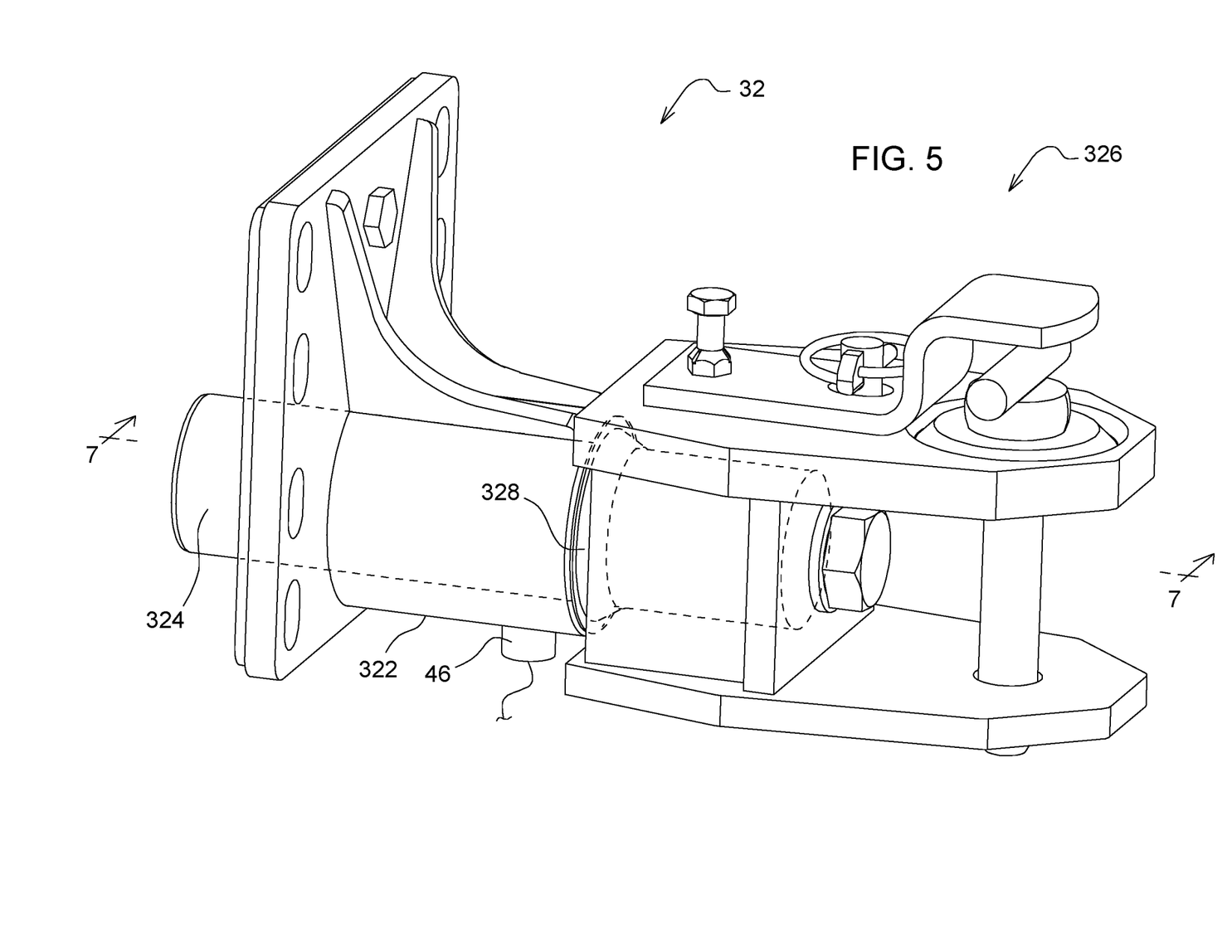
FIG. 5 is a perspective view of a clevis arrangement of a linkage of the baler.
Figure 6:
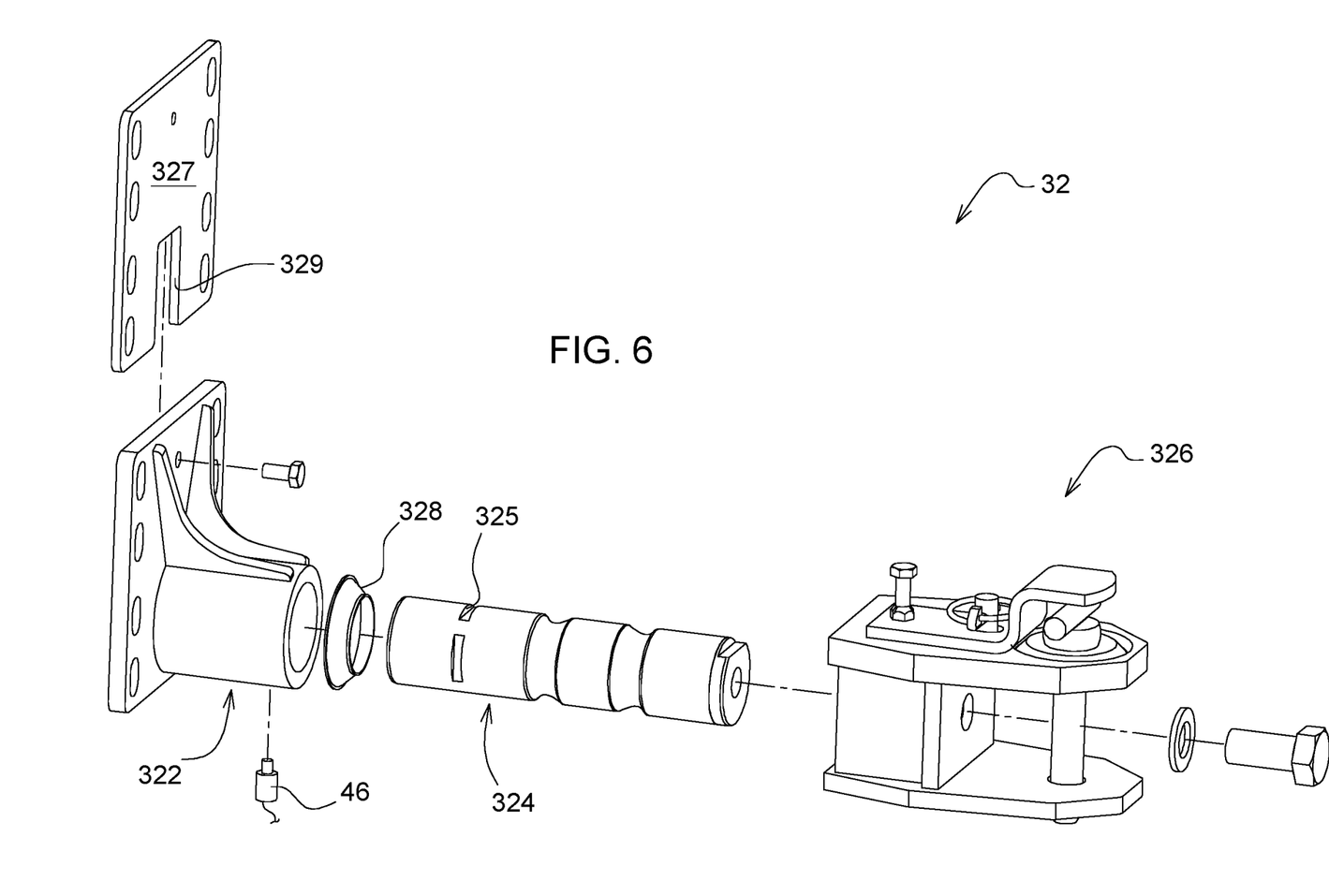
FIG. 6 is a partial exploded view of FIG. 5.

Referring to FIGS. 5, 6, as previously described, the clevis arrangement 32 includes the hitch housing (linkage housing) 322 and the hitch rod (shaft) 324 partially surrounded by the hitch housing 322. When assembled, the front/forward end (right end shown in FIGS. 5, 6) and rear end (left end shown in FIGS. 5, 6) of the hitch rod 324 are outside the hitch housing 322. The front end of the hitch rod 324 is located within the clevis 326. A portion adjacent to the rear end of the hitch rod 324 includes multiple edges 325 on its surface. The clevis arrangement 32 further includes a locking plate 327 affixed to the rear end of the hitch housing 322 via at least one nut and bolt. The locking plate 327 is coupled to the hitch rod 324. The locking plate 327 includes multiple edges 329, the number and shape of which are corresponding to those of the edges 325 of the hitch rod 324. Due to the engaged relationship between the edges 325 of the hitch rod 324 and the edges 329 of the locking plate 327, the movement between locking plate 327 and the hitch rod 324 is limited.

Figure 7A:
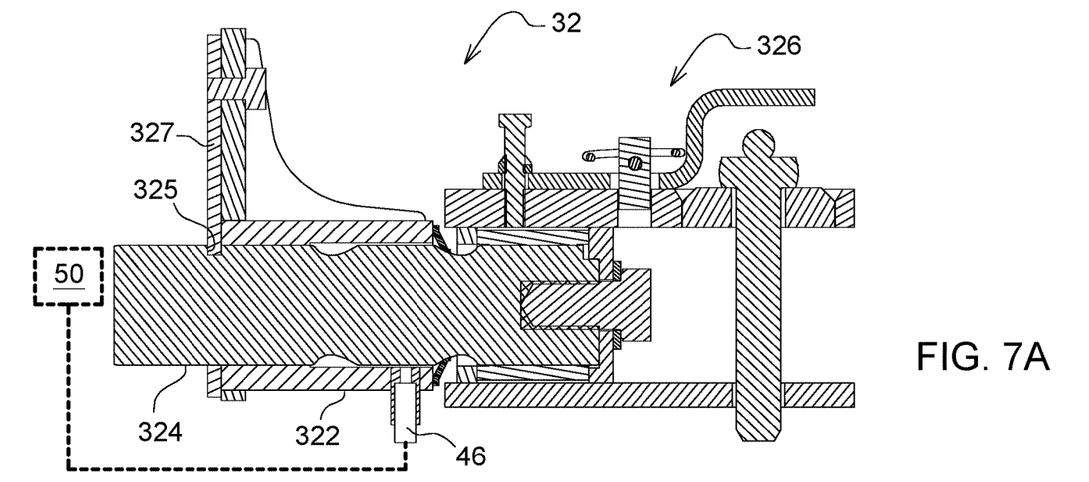
FIG. 7A is a cross-sectional view of FIG. 5.
Figure 7B:
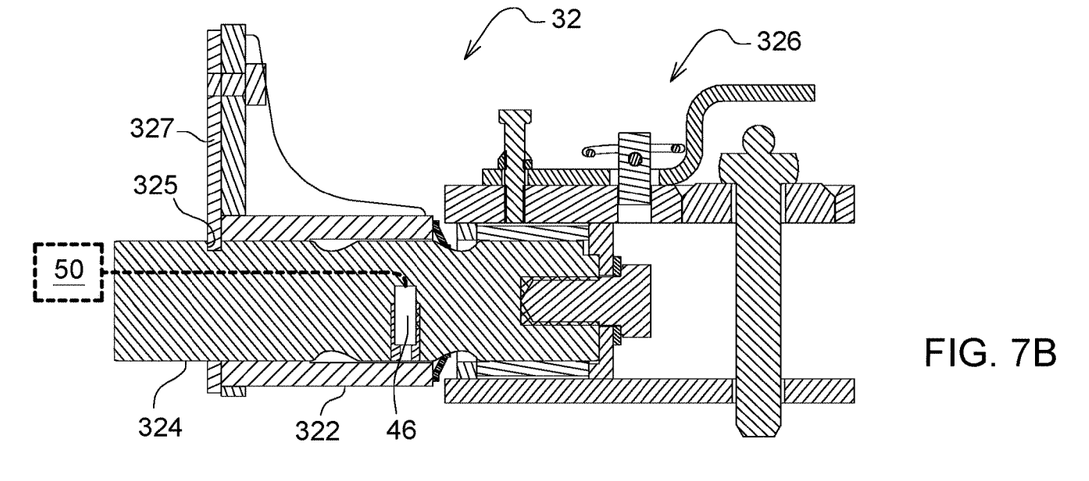
FIG. 7B is a cross-sectional view of another embodiment of a clevis arrangement and a sensor of a linkage of the baler.

With reference to FIGS. 5, 6, 7A, a third distance or linkage gap d3 is between the hitch housing 322 and the hitch rod 324. Because of the weight of the baler 10, with the forming bale B, finished bale B or without the bale B, the hitch rod 324 deflects in different degrees and therefore the third distance d3 is related to the weight of the baler 10 and the bale B. In the embodiment shown in FIGS. 5, 6, 7A, the third sensor 46 is positioned in the hitch housing 324 to detect the third distance d3. Alternatively, FIG. 7B demonstrates a cross-sectional view of a clevis arrangement and sensor of a linkage of the baler. In this embodiment, the third sensor 46 is positioned at the hitch rod 324 to detect the third distance d3. It is noted that the third sensor 46 may also be located at different positions such as a tractor drawbar, tongue weldment, or frame. It is noted that this embodiment illustrates the third distance between the hitch housing 322 and the hitch rod 324 reflecting a deflection of the hitch rod 324 is merely an example. Alternatively, the third sensor 46 can also be a strain-gage load cell.

In this embodiment, the processing unit 50 receives the deflection information from each of the individual sensors 40 including the first sensor 42, second sensor 44, and third sensor 46. The weight of the bale will be determined via the processing unit 50 by using the deflection measurements. In this regard, the measurement of the bale weight is more accurate by measuring the deflection of one or more weight bearing members within a structurally acceptable range of deflection for the member.

Optionally, a third seal 328 is coupled to the hitch housing 322 and the hitch rod 324. The third seal 328 prevents dust or other objects from entering into the opening space between the hitch housing 322 and the hitch rod 324. In this regard, dust or other debris does not influence the accuracy of the detection and the weight of the bale B is calculated more accurately.

Figure 8:
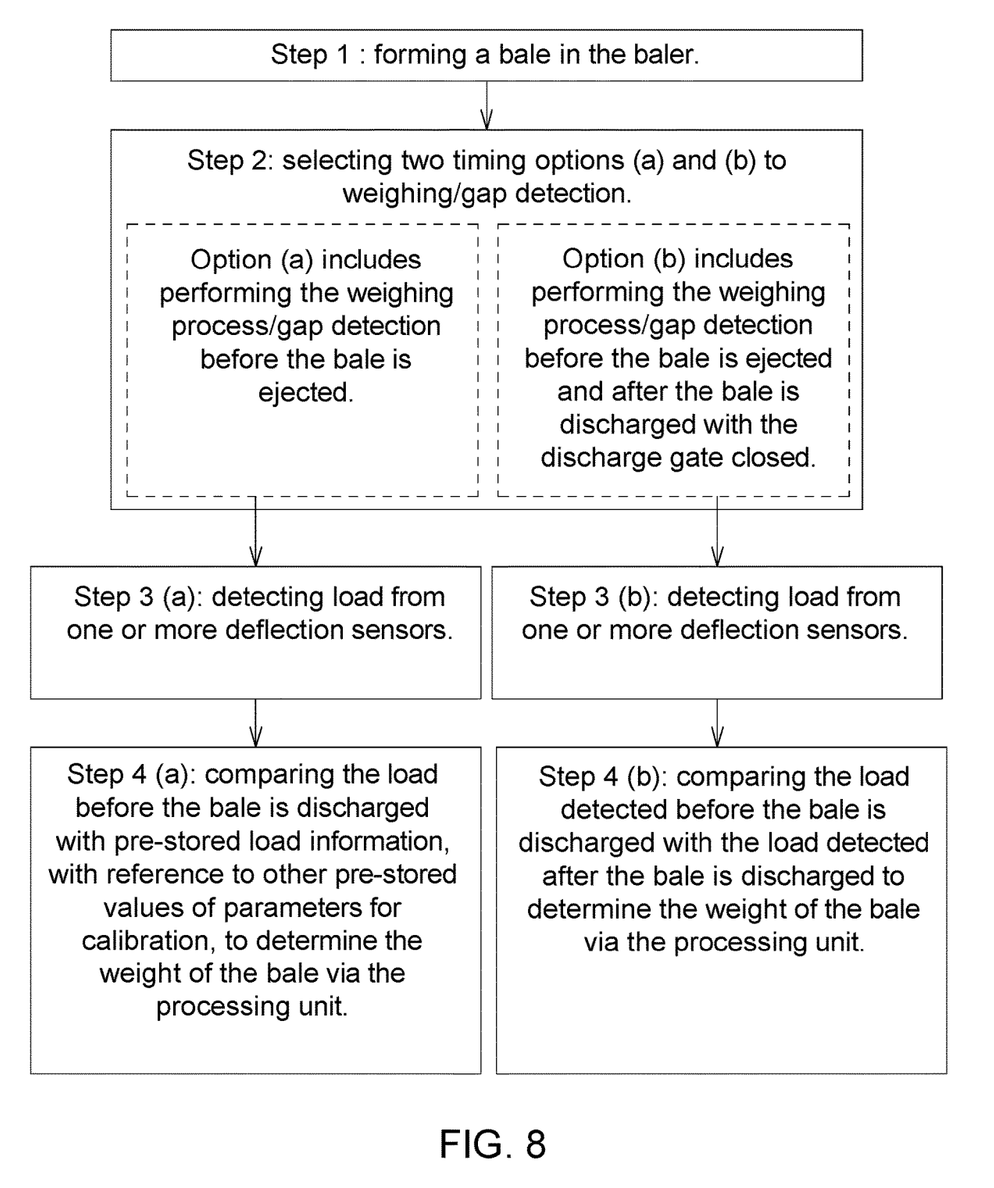
FIG. 8 is a flow diagram illustrating a method of measuring a weight of a bale under one of timing options.

With reference to FIG. 8, a method of measuring a weight of a bale is introduced.

Step 1 includes forming a bale in the baler.

Step 2 may include selecting two timing options—option (a) and option (b)—to weighing process/deflection gap (distance) detection. It is noted that this embodiment illustrates the deflection gap/distance applied to the deflection of axle(s) is only for demonstration. The deflection may include any other kinds of formats.

Option (a) includes performing the weighing process/deflection gap detection before the bale is ejected/discharged. The baler is stationary with only minimal movement noise from belts and bale turning. For accuracy, this process may be performed when the discharge gate is closed. Alternatively, this process can be performed when the discharge gate is open.

Option (b) includes performing the weighing process/deflection gap detection before the bale is ejected/discharged and after the bale is discharged with the discharge gate closed. Alternatively, this process can be performed when the discharge gate is open.

Step 3 (a) includes detecting load from one or more sensor. The step may include detecting at least one deflection gap that reflects the deflection of an axle from one or more sensors. In step 3 (a), the at least one deflection gap is detected once during the wrapping process. Step 3 (a) includes detecting at least one radial deflection gap between the axle and an axle housing surrounding the axle via at least one sensor when the bale is forming or formed. In this embodiment, the axle includes a first and second spindles; the axle housing includes a first housing and a second housing. The at least one radial deflection gap includes a first radial deflection gap (first distance) between the first spindle and a first housing and a second radial deflection gap (second distance) between a second spindle and a second housing.

Step 3 (b) includes detecting load from one or more sensor. This step may include detecting at least one deflection gap from one or more sensors. In step 3 (b), the least one deflection gap is detected twice—once during the wrapping process (or the wrapping process is completed) and once after the wrapped bale is discharged. In this embodiment, the weight of the baler with the bale distributed among the first spindle, second spindle, and hitch to cause deflections of those three elements and the deflection gaps between those three elements and their housings are changed and detected by the sensors. There are multiple factors influencing the amount of deflection, including the locations of fulcrums, the length of the arms that forces applied, the Young's modulus of those three elements, the positions of those three elements, whether the baler is moving or performing its function like wrapping. Those factors may have corresponding values of parameters that will be utilized by the processing unit in later step.

Step 4 (a) includes loads comparison between prestored load and detected load. The step may include comparing the at least one deflection gap with other information to calculate the weight of the bale. Step 4 (a) includes comparing the at least one deflection gap detected before the bale is discharged with pre-stored deflection gap information, with reference to other pre-stored values of parameters for calibration, to determine the weight of the bale via the processing unit. The pre-stored information may include various material properties of the deflecting members, including information necessary to convert the deflection of the members to a force or weight. The pre-stored information may include the weight of the baler without the bale (empty weight).

Step 4 (b) includes loads comparison between two detected loads. The step may include comparing the at least one deflection gap detected before the bale is discharged with the deflection gap detected after the bale is discharged to determine the weight of the bale via the processing unit.

In order to prevent the axle from over deflecting, Step 3 may include limiting changes in deflections in a pre-determining deflection via overload stops protruding from the axle housing toward the axle and/or protruding from the hitch housing toward the hitch rod.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A baler for forming a bale, comprising:
a frame supporting a bale chamber;
an axle connected to the frame at a first location and spaced apart from the frame at a second location;
a sensor positioned to measure the deflection of the axle, the deflection of the axle changing based upon a weight of the bale; and
at least one overload stop positioned on one of the axle and the frame to limit the deflection of the axle relative to the frame.

2. The baler of claim 1, wherein the frame comprises a housing at least partially surrounding the axle, the sensor positioned to detect a change in distance between the axle and the housing due to the deflection of the axle.

3. The baler of claim 2, wherein the housing surrounds the axle and at least partially encloses the sensor.

4. The baler of claim 3, wherein the housing comprises a seal positioned at the interface between the housing and the axle enclosing the sensor and a portion of the axle.

5. The baler of claim 1, comprising:
a housing at least partially surrounding the axle; and
a first overload stop protruding from one of the housing and the axle and a second overload stop protruding from one of the housing and the axle, the first and second overload stops spaced apart and respectively positioned on one end of the axle, wherein a range of the first deflection detected by a first sensor is reduced by the first overload stop and a range of the second deflection detected by a second sensor is reduced by the second overload stop.

6. The baler of claim 1, wherein the axle includes a portion at the second location which extends radially outward more than an adjacent portion of the axle.

7. The baler of claim 1, wherein the axle comprises a spindle fixedly attached to the frame and operatively connected to a ground engaging device.

8. The baler of claim 1, further comprising:
a processing unit operatively connected to the sensor and configured to calculate a weight of the bale based upon changes in the deflection of the axle as measured by the sensor.

9. The baler of claim 1, further comprising at least one mounting plate, wherein an inner surface of the housing radially protrudes at least one mounting platform, the axle includes a groove, a portion of the mounting plate inserted into the groove of the axle and the mounting plate is coupled to the at least one mounting platform.

10. The baler of claim 9, wherein the bottom of the groove includes multiple first edges, the at least one mounting plate includes multiple second edges, the first edges and second edges contact to one another to limit the mounting plate moving relative to the axle.

11. The baler of claim 1, wherein the at least one overload stop is a ring shape.

12. A method of measuring a weight of a bale in a baler, comprising:
determining a first deflection of an axle via a sensor;
forming a bale in the baler;
detecting a second deflection of the axle via the sensor;
comparing the first and second deflections of the axle to calculate the weight of the bale; and
limiting the deflection of the axle within a pre-determined amount via an overload stop.

13. The method of claim 12, the step of detecting at least one deflection further comprising:
detecting a first deflection of the axle based upon a first distance between the axle and an axle housing; and
detecting a second deflection of the axle based upon a second distance between the axle and the axle housing.

14. The method of claim 13, further comprising:
comparing a difference between the first and second distances to calculate the weight of the bale.

* * * * *